United States Patent [19]

Chang

[11] Patent Number: 5,213,028

[45] Date of Patent: * May 25, 1993

[54] MULTIPLE PURPOSE COOKING UTENSIL SYSTEM

[76] Inventor: Cherng Chang, 3065 Maginn Dr., Beavercreek, Ohio 45434

[ * ] Notice: The portion of the term of this patent subsequent to Oct. 13, 2009 has been disclaimed.

[21] Appl. No.: 958,231

[22] Filed: Oct. 8, 1992

Related U.S. Application Data

[63] Continuation of Ser. No. 648,919, Feb. 1, 1991, Pat. No. 5,154,114, which is a continuation of Ser. No. 428,830, Oct. 30, 1989, abandoned.

[51] Int. Cl.⁵ .............................................. A47J 27/12
[52] U.S. Cl. ........................................ 99/340; 99/426; 16/110 A; 16/126; 126/373; 220/912
[58] Field of Search ................. 99/340, 413, 414, 422, 99/426; 16/119, 120, 126; 126/9 B, 348, 357, 373, 384; 220/23.86, 94 R, 95, 912; D7/354, 356, 359–361, 391, 393

[56] References Cited

U.S. PATENT DOCUMENTS

| | | | |
|---|---|---|---|
| D. 253,574 | 12/1979 | Anderson, Jr. ................ | D7/356 |
| 383,943 | 6/1888 | Conde ......................... | 220/94 R |
| 437,706 | 10/1890 | Mathias ....................... | 126/269 |
| 506,302 | 10/1893 | Bowers . | |
| 578,389 | 3/1897 | Challis ......................... | 220/94 R |
| 597,217 | 1/1899 | Loery .......................... | 16/126 |
| 797,314 | 8/1905 | Owens ......................... | 220/912 |
| 1,012,690 | 12/1911 | Moore ......................... | 220/95 |
| 1,026,093 | 5/1912 | Johnson . | |
| 1,232,360 | 7/1917 | Miller ......................... | 99/414 |
| 1,644,063 | 10/1927 | Kircher . | |
| 2,144,661 | 1/1939 | Nelson . | |
| 2,667,829 | 2/1954 | McNutt . | |
| 3,081,394 | 3/1963 | Arel . | |
| 3,341,047 | 9/1967 | Nauta ......................... | 220/95 |
| 4,053,295 | 10/1977 | Miyauchi . | |

FOREIGN PATENT DOCUMENTS

| | | | |
|---|---|---|---|
| 944572 | 4/1974 | Canada ........................ | 220/94 R |
| 341601 | 10/1921 | Fed. Rep. of Germany .... | 220/94 R |
| 1304149 | 8/1962 | France ......................... | 16/126 |
| 17746 | of 1896 | United Kingdom ............ | 220/94 R |
| 224116 | 11/1924 | United Kingdom . | |

OTHER PUBLICATIONS

West Bend Aluminum Co., "Electrical Merchandising", Feb. 1954, p. 36.
"Mirro, The Finest Aluminum", Mirro Catalog No. 118, 1941, p. 24.

Primary Examiner—Harvey C. Hornsby
Assistant Examiner—Mark Spisich
Attorney, Agent, or Firm—Jacox & Meckstroth

[57] ABSTRACT

A multiple purpose cooking utensil system. The cooking utensil system consists of a cooking utensil vessel preferably made of aluminum and a cooking utensil cover preferably made of stainless steel or non-metallic material. In addition to serving as a cooking utensil cover, the cooking utensil cover can be converted to serve as a general purpose food container and/or an utensil vessel for microwave cooking. Single or double bail handle members facilitate the conversion of the cooking utensil cover for the multiple usage. In a group consisting of two or more cooking utensil covers one cooking utensil cover can serve as a cover for another cooking utensil cover when the other cooking utensil cover is used as a food container. In this arrangement a handle member firmly holds the two cooking utensil covers together.

18 Claims, 5 Drawing Sheets

MULTIPLE PURPOSE COOKING UTENSIL SYSTEM

RELATED APPLICATION

This application is a continuation of Application Ser. No. 07/648,919, filed Feb. 1, 1991, now U.S. Pat. No. 5,154,114, which is a continuation of Application Ser. No. 07/428,830, filed Oct. 30, 1989, now abandoned.

BACKGROUND OF THE INVENTION

This invention relates to a cooking utensils such as sauce pans, frying pans, skillets, Dutch ovens, and the like to which heat is applied at some point during the use thereof for purpose of cooking. More specifically, this invention discloses improvement in the structure of cooking utensil members whereby these members can serve as cover members and also as containers.

A cooking utensil vessel and a cooking utensil cover are two items which are commonly used together in home cooking activities. The cooking utensil vessels are generally used for containing foods during cooking, while the cooking utensil covers merely serve as covers for the vessels. Due to the fact that the cooking utensil vessels are subject to severe wear in daily use, a cooking utensil vessel may become unusable, while the cooking utensil cover is still usable. Customarily, after a cooking utensil vessel becomes unusable little use can be expected out of the cover, even though the cover may be in a good condition.

Most household cooking utensil covers comprise a concavo-convex body section, typically made of formed sheet metal. The concave side of the cover is faced downwardly as it covers the cooking utensil vessel during cooking. When the cooking utensil cover is turned over to its inverted position with the concave side facing upwardly it may, at least in principle, serve as a container. Indeed, some types of cooking utensil covers, in an inverted orientation, may be employed as containers.

However, in reality most cooking utensil covers are not designed for use as containers. This is evidenced by the fact that most cooking utensil covers have a handle in the form of a knob or the like located at the center of its convex side. Obviously, this makes the cover very unstable and unsuitable for holding food when it is inverted and positioned on a table. The purpose for such a knob is understandable since a cover with its handle located right at its top center provides the best configuration for serving its function as a cooking utensil cover. As the knob is held, the utensil cover can be very easily lifted for inspecting the food and/or for removal of food from the cooking utensil vessel.

Certain special purpose cooking utensil covers have a flat top section and a long side arm handle. This type of cover is usable as a container in its inverted position. However, the long side arm handle makes it bulky and unstable, and is not practical as a container for general household use.

Several types of cooking utensils for outdoor use have covers designed to be used as a bowl in its inverted position. Such a cover typically has a side handle which is removable from the cover body for compactness during storage. However, such a cover is not convenient to use in a general household application. Furthermore, the cover is useless if the handle is misplaced.

Since both a cooking utensil vessel and a cooking utensil cover are used together for the purpose of cooking, the vessel and the cover are generally acquired as a matched set. Actually, most commercially available cooking utensil systems consist of several such matched sets with different sizes and/or shapes in order to fulfill most cooking needs. In these systems each cooking utensil cover must be employed with a matched cooking utensil vessel.

A majority of cooking utensil vessels are made of aluminum or aluminum alloys. Aluminum is employed because of its superior heat conductivity property. This property is especially important for cooking utensil vessels used on the surface heating units of electric ranges or the like. In this kind of cooking it is important that heat is evenly distributed to the entire bottom surface of the cooking utensil vessel.

Perhaps largely for convenience in production, most cooking utensil covers are also made of aluminum or aluminum alloys. This does not present a problem unless the cooking utensil cover is also used as a food container. One of the major problems with aluminum food containers is the chemical reactivity of aluminum with certain foods during long term storage. Such chemical reactivity may cause pitting and/or discoloration of the aluminum surface. One other problem in the use of aluminum as a container material relates to its weak mechanical strength. An aluminum container will warp and dent easily after extended usage. An aluminum surface quickly loses its surface shiningness with use. Furthermore, an aluminum container is not suitable for food warming/cooking in a microwave oven, because of its undesirable characteristics in reflecting microwave radiation.

It is an object of this invention to provide a cooking utensil cover which can serve as an ideal utensil cover by having a handle above its top center area, and which can also be converted into a general purpose food container.

It is also an object of this invention to provide a cooking utensil cover which can be readily converted into a container and which can also be readily reconverted to a cover.

It is another object of this invention to provide such a cover member which can be produced at relatively low costs with conventional manufacturing techniques.

Another object of this invention is to provide a cooking utensil cover which includes rotatable bail handle means which permit the cooking utensil cover to be used as either a cooking utensil cover or as a food container.

One further object of this invention is to provide a cooking utensil cover equipped with bail handle means and bail mounting means having an unique surface contour which permits the position of said bail handle means to be changed with ease.

It is also an object of this invention to provide a cooking utensil system which consists of a cooking utensil vessel and a matching cooking utensil cover. The cooking utensil vessel is constructed of aluminum for its superior heat conductivity property, and in which the cooking utensil cover is constructed of a material or materials other than aluminum, whereby the cover can be converted for use as a container, with the cover having chemical inertness, mechanical strength and compatibility with microwave cooking.

It is also an object of this invention to provide a cooking utensil system which consists of multiple sets of cooking utensil vessels and matching cooking utensil covers, having various sizes and/or shapes.

Other objects and advantages of this invention reside in the construction of parts and the combination thereof, the mode of production and use, as will become more apparent from the following description.

SUMMARY OF THE INVENTION

This invention comprises a cooking utensil system which includes a cooking utensil vessel and a matching cooking utensil cover. The cooking utensil vessel is constructed of a material such as aluminum which has excellent heat transfer qualities. The cooking utensil cover is constructed of a material or materials which are very suitable as containers of cooked foods, as well as being very suitable as cooking utensil covers. In this invention a cooking utensil cover includes handle means which permit the cover to be used both as a cover and as a container.

DESCRIPTION OF THE PREFERRED EMBODIMENTS

Figures 1, 3:
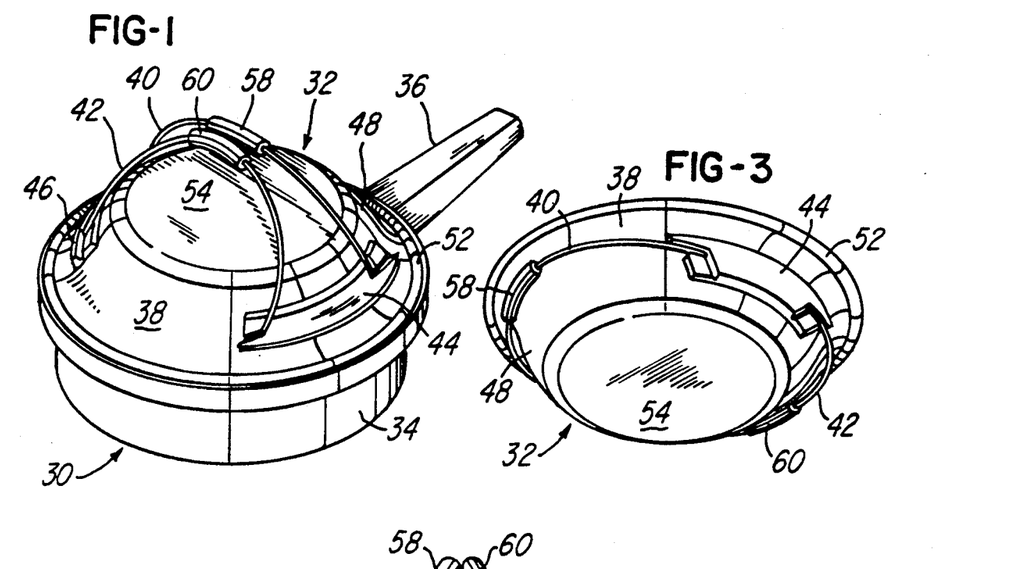
FIG. 1 is a perspective view showing a cooking utensil unit of this invention as the unit consists of a cooking utensil vessel and a cooking utensil cover.
FIG. 3 is a perspective view, drawn on substantially the same scale as FIG. 1, showing the cooking utensil cover of FIG. 1 with its bails thereof in a different position.
Figure 2:
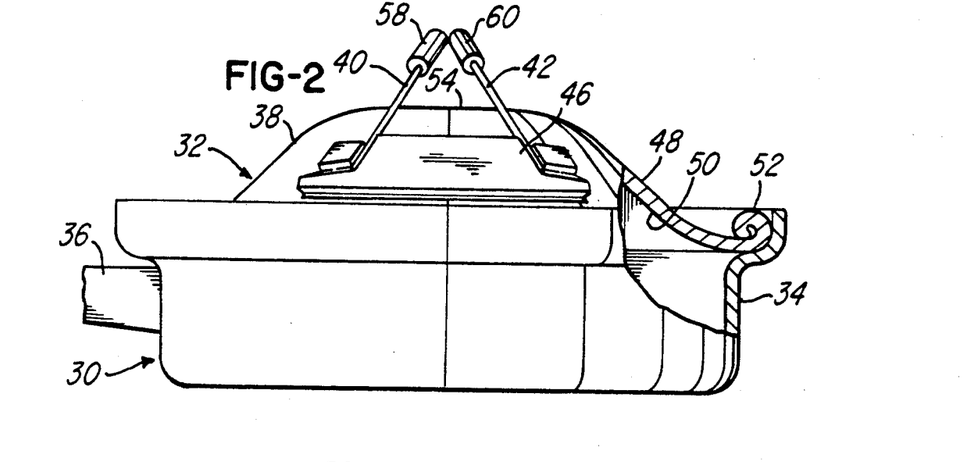
FIG. 2 is an elevational view, with parts broken away, shown in section and drawn on a larger scale than FIG. 1, showing the cooking utensil unit of FIG. 1. This view shows the bails of the cooking utensil cover in a lift position.

A cooking utensil unit of this invention as illustrated in FIGS. 1 and 2 comprises a cooking utensil vessel 30 and a cooking utensil cover 32. The cooking utensil vessel 30 is in the form of a sauce pan or the like which has a vessel body 34 and an elongate handle 36. It is preferable that the vessel body 34 be constructed of aluminum or aluminum alloys. Aluminum is well known for its superior heat conductivity property.

The cooking utensil cover 32 comprises a concavo-convex cover body 38, a pair of movable bails 40 and 42, to which are attached a pair of bail mounting units 44 and 46. The cover body 38 is preferably constructed of sheet metal which is formed into a concavo-convex shape with a convex side 48 and a concave side 50. The cover body 38 has a rim portion 52 which is curved to form a smooth edge for snugly resting on the utensil vessel body 34. The cover body 38 has a central portion 54 which is shown as being substantially flat.

Figure 4:
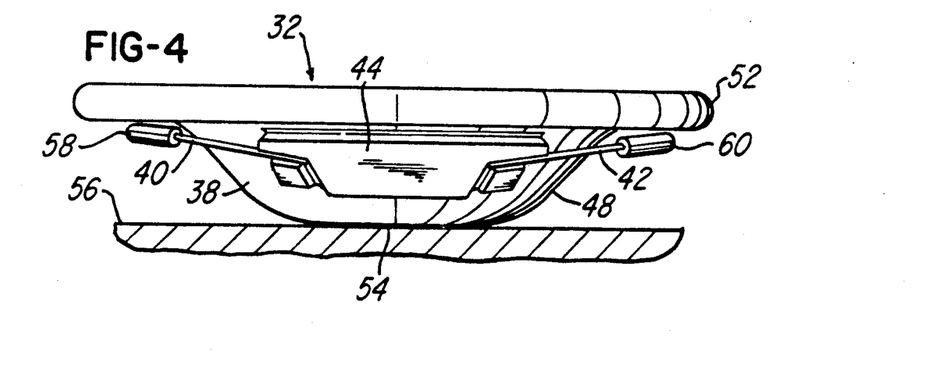
FIG. 4 is an elevational view, drawn on substantially the same scale as FIG. 2, showing the cooking utensil cover, with the bails arranged as shown in FIG. 3, as the cover rests on a surface.

In FIGS. 1 and 2 the cooking utensil cover 32 is shown serving as a closure member for the cooking utensil vessel 30. In this position the convex side 48 of the cover body 38 faces upwardly while the concave side 50 of the cover body 38 faces downwardly. When the cooking utensil cover 32 is removed from the cooking utensil vessel 30 the cooking utensil cover 32 can be inverted to a position shown in FIGS. 3 and 4. In this position the convex side 48 of the cover body 38 faces downwardly, while the concave side 50 of the cover body 38 faces upwardly. Since the central portion 54 of the exterior surface of the cover body 38 is substantially flat, the cover body 38 can readily rest on a flat surface such as a table 56, as illustrated in FIG. 4. The positions of the bails 40 and 42 are changed when the cooking utensil cover 32 is inverted to the position shown in FIG. 4. This adjustment of the bails 40 and 42 is discussed below.

As shown in FIG. 4, in this inverted position the cooking utensil cover 32 can serve as a food container. In this inverted position, the utensil cover may serve as a mixing bowl for food preparation, or as a general container for temporarily retaining food prior to cooking thereof. The cover 32 may also serve as a container for food leftover storage. With the availability of this cooking utensil cover 32, additional dedicated food containers are not required. Furthermore, additional storage space for additional containers is not necessary.

The cover body 38 is preferably constructed of stainless steel material. Conventionally, the election of material for a cooking utensil cover is of little importance. However, in this invention the cover body 38 is not only a cover for the cooking utensil vessel 30 but also serves as a food container. Preferably, but not necessary, stainless steel is the material of which the cover body 38 is constructed. This choice is based upon the fact that stainless steel is chemically inert toward most foods which come into direct contact with the cover body 38 for an extended period of time. Other advantages of stainless steel may include superior mechanical strength and surface shiningness, all of which are important considerations for food container usage.

Each of the bails 40 and 42 is generally in the shape of a half circle. Mounted at the central portion of the bails 40 and 42 are hand grips 58 and 60, respectively. The hand grips 58 and 60 are made of heat insulation materials, such as plastic materials. When the cover 32 is in the position shown in FIGS. 1 and 2, the hand grips 58 and 60 may be grasped for lifting and holding the cooking utensil cover 32.

Figure 5:
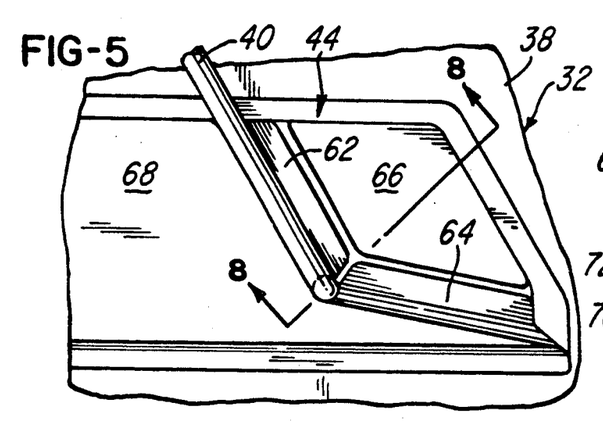
FIGS. 5, 6, and 7 are enlarged fragmentary perspective views of a portion of the bail and bail mounting structure of the cover. These views show the bail in a plurality of functional positions.

The bail mounting units 44 and 46 are two identical units, which are preferably press formed from sheet metal and rigidly attached, preferably, by welding to the cover body 38 on its convex side 48. A connection portion of the mounting unit 44 is shown in detail in FIGS. 5, 6 and 7. As seen in these figures, the upper surface of the connection portion of the bail mounting unit 44 is composed of three distinct regions. The first region has two straight valleys 62 and 64. These valleys 62 and 64 are shown as being angular, one with respect to the other. The second region is a plateau 66 located on one corner of the bail mounting unit 44 and is adjacent the valleys 62 and 64. The third region 68 is essentially a relatively large and curved plateau which is higher than the square plateau 66 when the cover body 38 is positioned as shown in FIGS. 1 and 2.

Figures 7, 10:
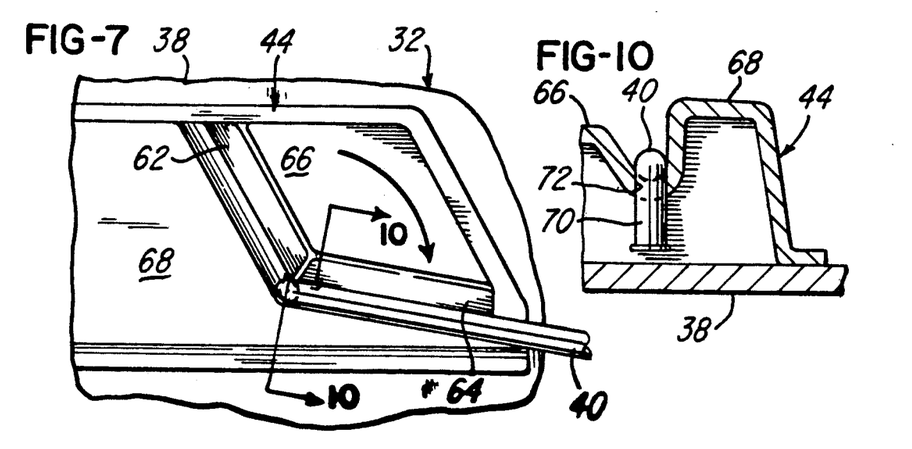
FIGS. 8, 9, and 10 are enlarged sectional views of the bail and bail mounting structure, taken substantially on lines 8—8, 9—9, and 10—10 of FIGS. 5, 6, and 7, respectively.
Figure 8:
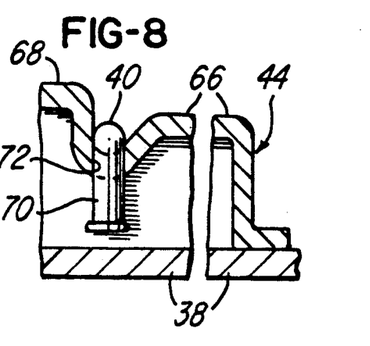
Figure 9:
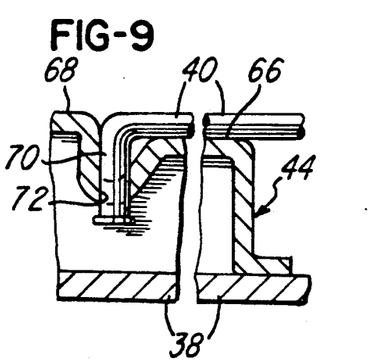

FIGS. 8, 9 and 10 illustrate the details of mounting of the bail 40 on the bail mounting unit 44. The bail 40 has a right angle end section 70 which is positioned within an opening 72 which is located at the intersection of the valleys 62 and 64. A similar bent end section is also located on the other end of the bail 40 which is positioned within an opening in the bail mounting unit 46. The entire length of the bail 40 is constructed of a metal wire which is performed to act as a torsion wire spring. The two bent end sections of the bail 40 are stretched apart against the wire spring force when the bail 40 rests on the valley 62 of the bail mounting unit 44 and a similar valley, not shown, of the bail mounting unit 46. As a result, this bail 40 will firmly engage these valleys as a result of the spring force within the bail 40. The bail 40 is thus normally retained in the position thereof shown in FIGS. 1, 2, 5 and 8.

Figure 6:
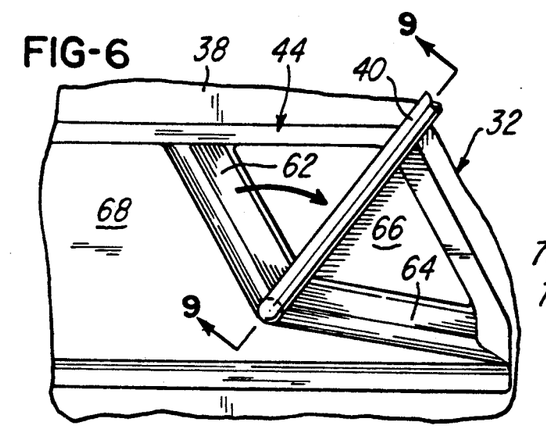

As the bail 40 is pulled away from the valley 62, the bail 40 is forced to rotate by rising above the square plateau 66 as shown in FIGS. 6 and 9. As the bail 40 is rotated beyond the square plateau 66, as a result of its spring force, the bail 40 will quickly drop into the valley 64 and be retained in the valley 64 as shown in FIGS. 7 and 10. The bail 40 is also retained in a similar valley, not shown, of the bail mounting unit 46. The bail 42 can also be rotated in similar manner as the bail 40.

The unique arrangement of the bails 40 and 42 and the bail mounting units 44 and 46 achieve two important goals. First, when the bails 40 and 42 are rotated to the positions thereof shown in FIGS. 1 and 2, the hand grips 58 and 60 are located above the center of the cover body 38 on the convex side 48 of the cover body 38. The central location of the hand grips 58 and 60 allows the utensil cover 32 to be easily lifted for inspecting the food in the cooking utensil vessel 30 and placed back after the inspection. Next, when the bails 40 and 42 are rotated to the positions thereof shown in FIGS. 3 and 4, the cooking utensil cover 32 can be readily inverted and used as a food container, as shown in FIG. 4.

Figure 11:
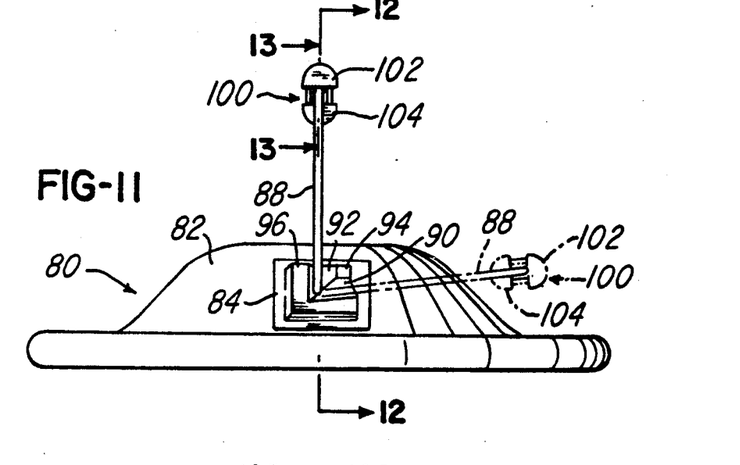
FIG. 11 is an elevational view illustrating another embodiment of a cooking utensil cover of this invention. This view illustrates two positions of the bail of the cover.
Figure 12:
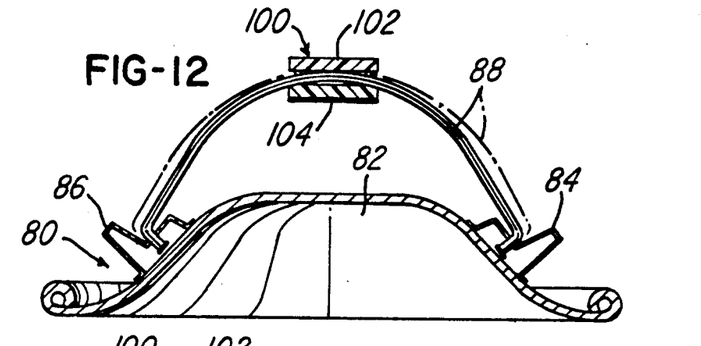
FIG. 12 is a sectional view of the cooking utensil cover of FIG. 11, taken substantially on line 12—12 of FIG. 11.

FIGS. 11 to 16 illustrate another embodiment of this invention, In this embodiment only one bail is used for a cooking utensil cover 80. The cooking utensil cover 80 shown in FIGS. 11 and 12 is similar to the cooking utensil cover 32. The cooking utensil cover 80 is comprised of a concavo-convex cover body 82, and a pair of bail mounting units 84 and 86. The cooking utensil cover 80 has only one bail 88. The bail 88 is rotatably mounted on bail mounting units 84 and 86.

The bail mounting units 84 and 86 are made of sheet metal press formed to the shape shown and are rigidly attached to the cover body 82. The upper surface of the bail mounting unit 84, as shown in FIG. 11, is composed of two straight valleys 90 and 92, a square plateau 94 and high altitude plateau 96. The bail mounting unit 86 is a mirror image of the bail mounting unit 84, with substantially the same upper surface structure.

The entire length of the bail 88 is constructed of a metal wire which is preformed to act as a torsion wire spring. The bail 88 is rotatable between a first position and a second position. The first position is shown in FIG. 11. In this position the bail 88 is firmly retained within a straight valley 92 of the bail mounting unit 84 and a substantially identical valley, not shown, of the bail mounting unit 86. This is the position of the bail 88 when the cooking utensil cover 80 is used as a cover for a cooking utensil vessel.

When the bail 88 is rotated to the second position, as indicated by a dash line in FIG. 11, the bail 88 falls into and is firmly retained within the straight valley 90 of the bail mounting unit 84. In this position the bail 88 is also within a substantially identical valley, not shown, of the bail mounting unit 86. This is the position of the bail 88 when the cooking utensil cover 80 is inverted to serve as a food container.

Figure 13:
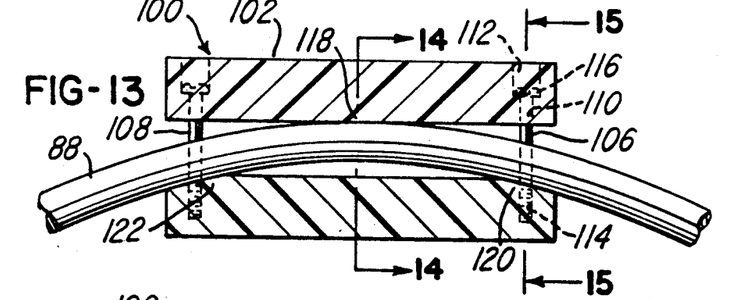
FIG. 13 is an enlarged sectional view of the hand grip portion of the bail of the cover shown in FIG. 11, taken substantially on line 13—13 of FIG. 11.

Also shown in FIGS. 11 and 12 is a hand grip 100 which is mounted on the center portion of the bail 88. FIG. 13 is an enlarged cross-sectional view showing the details of this hand grip 100. This hand grip 100 comprises an upper portion 102 and a lower portion 104. Each of which is made of heat insulating material, such as a plastics material. These two portions 102 and 104 are held together by means of two screws 106 and two screws 108. These screws, 106 and 108, are shown in FIG. 13. A part of the bail 88 is thus firmly positioned between the two portions 102 and 104 of the hand grip 100.

Each of the screws 106 is shown within a counterbore 112 in the upper portion 102. It is then screwed into a screw hole 114 in the lower portion 104, until the screw head 116 is stopped by the counterbore 112. The screws 108 are also similarly secured.

Figure 14:
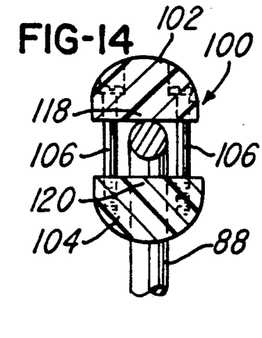
FIG. 14 is a fragmentary sectional view taken substantially on line 14—14 of FIG. 13.
Figure 15:
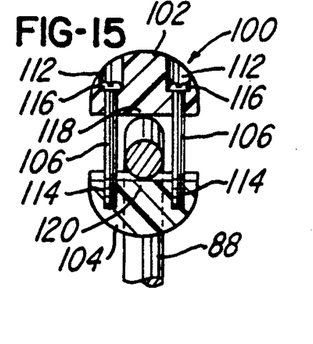
FIG. 15 is a fragmentary sectional view taken substantially on line 15—15 of FIG. 13.
Figure 16:
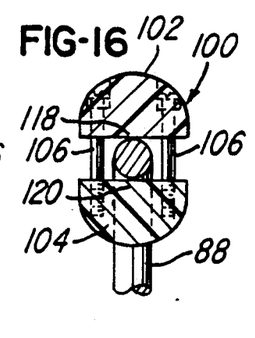
FIG. 16 is a fragmentary sectional view, similar to FIG. 14, showing a moved position of parts of the grip portion of the bail of the cover of FIGS. 11 and 12.

As clearly shown in FIG. 13, as well as FIGS. 14 and 15, only a center section 118 of the upper portion 102 of the hand grip 100 is actually in contact with the bail 88. In contrast, only two spaced-apart sections 120 and 122 of the lower portion 104 are in contact with the bail 88. When the hand grip 100 is grasped the portion 102 and 104 can be squeezed one toward the other. When the upper portion 102 and the lower portion 104 are squeezed one toward the other, as shown in FIG. 16, the bail 88 is forced to deform to the shape as shown by the dash line in FIG. 12. With this deformation the bail 88 is released from the valley 92 of the bail mounting unit 84 and the other valley, not shown, of the bail mounting unit 86. Consequently, the bail 88 can be freely rotated between the two positions illustrated in FIG. 11. Thus a convenient method is provided to change the position of the bail 88 with only one hand holding and pressing the hand grip 88. After the new bail position is reached, the hand squeeze force upon the hand grip 100 is released, the bail 88 is quickly restored to its original shape and is maintained at the adjusted bail position.

Figures 17, 18, 19, 20, 21, 22, 23:
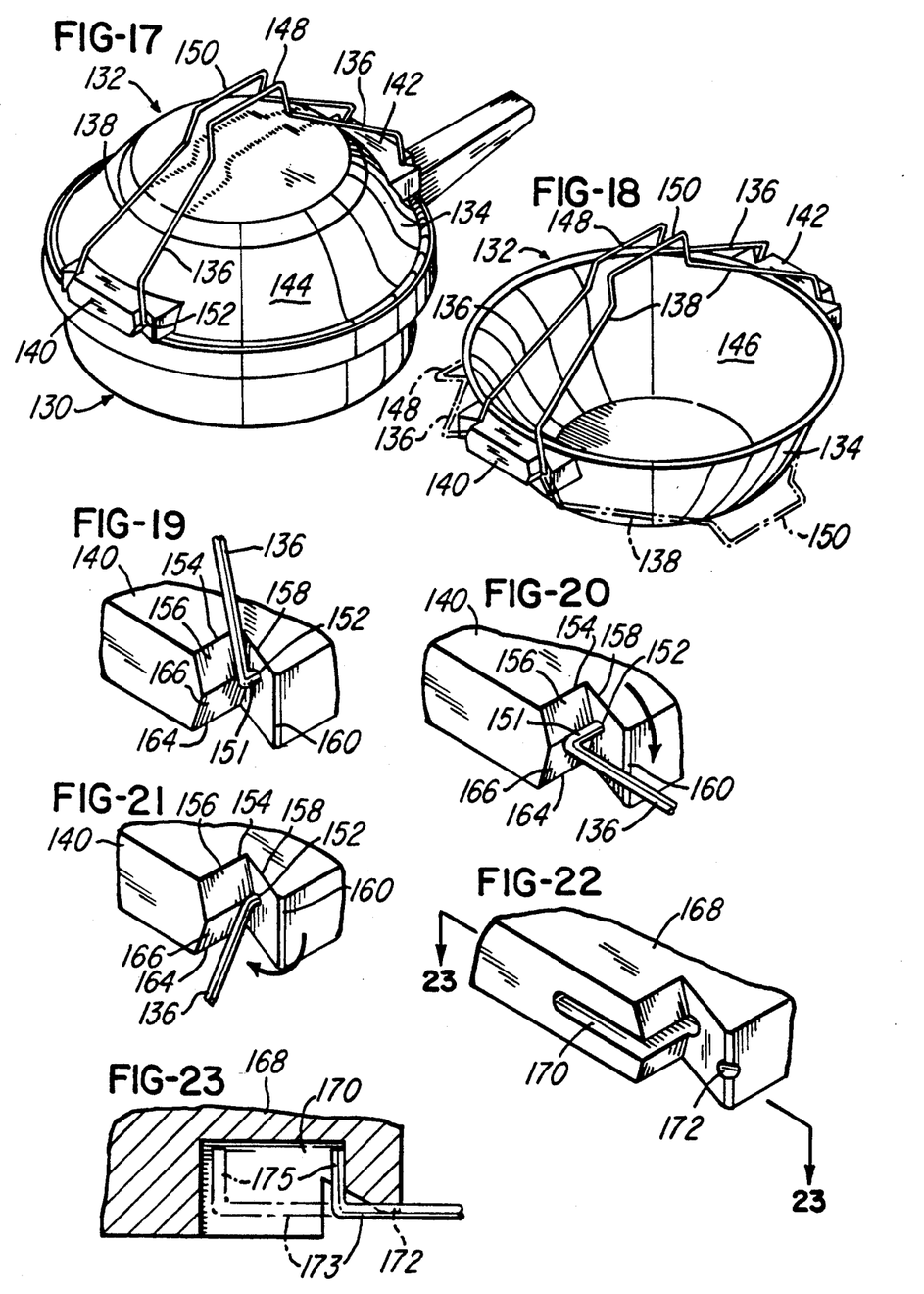
FIG. 17 is a perspective view of another embodiment of a cooking utensil unit of this invention, including a cooking utensil vessel and a cooking utensil cover.
FIG. 18 is a perspective view of the cooking utensil cover of FIG. 17 with parts thereof in different relative positions.
FIGS. 19, 20, and 21 are enlarged, fragmentary perspective views showing a portion of the bail and bail mounting structure of FIG. 17 with the bail moved to different positions.
FIG. 22 is a fragmentary perspective view, drawn on substantially the same scale as FIGS. 19, 20, and 21, showing a modification in the bail mounting structure of this invention.
FIG. 23 is a sectional view, taken substantially on line 23—23 of FIG. 22, illustrating the bail mounting structure of FIG. 22 and a bail, shown in two operative positions thereof.

FIG. 17 illustrates an another embodiment of a cooking utensil system of this invention. This cooking utensil system comprises a cooking utensil vessel 130 and a cooking utensil cover 132. The cooking utensil cover 132 includes a concavo-convex cover body 134, a pair of rotatable bails 136 and 138, and a pair of bail mounting units 140 and 142. The convex side 144 and concave side 146 of the cover body 134 are shown in FIGS. 17 and 18, respectively.

As shown in FIG. 17, the cooking utensil cover 132 serves as a cover for the cooking utensil vessel 130 with its convex side 144 facing upwardly. When inverted as shown in FIG. 18 with the concave side 146 facing upwardly, the cooking utensil cover 132 becomes a food container. In this invention the cooking utensil cover 132 may also serve a third function, that is, an utensil vessel for microwave cooking. The body 134 is preferably constructed of non-metallic material which is compatible with microwave cooking. The most ideal material for this application is glass ceramics of various compositions, such as beta-spodumene, beta-quartz, cordierite and nepheline. These materials are well known for their excellent mechanical strength, thermal shock property and suitability for mass production The bail mounting units 140 and 142 are preferably integrally attached to the cover body 134. This can be easily achieved in glass ceramics, because glass ceramics can be readily formed into any delicate shape through various industrial forming processes.

The bails 136 and 138 are made of metal wire and shaped as shown in FIG. 17. The hand grip sections 148 and 150 of the bails 136 and 138, respectively, are straight to facilitate the hand holding of the bails. Each of the bails 136 and 138 has a right angle end 151 which is inserted into an opening 152 in the bail mounting units 140 or 142, as shown in FIGS. 17–20. Both the bails 136 and 138 are formed to act as torsion wire springs. The spring force of these springs causes the bails 136 and 138 to hug and stay engaged with the bail mounting units 140 and 142 at all times.

FIGS. 19, 20 and 21 show the details of the bail mounting unit 140 of this invention and the rotation of the bail 136 with respect to the bail mounting units 140 and 142. The outside of the bail mounting unit 140 is shaped by several flat surfaces and lines, the purpose of which is discussed below.

In FIG. 19 the bail 136 is rotated to a first extreme position with the bail 136 resting against an edge line 154 and a surface 156. In this position the hand grip section 148 is located above the cover body 134 on the convex side 144 of the cover body 134. This is the position in which the bails 136 and 138 serve as handles for holding the cover body 134 as the cover body 134 serves as an utensil cover, as shown in FIG. 17.

As the bail 136 is forced to rotate away from the first extreme position, the bail 136 is stretched against its spring force as guided by an edge line 158. Once the bail 138 is rotated beyond the edge line 158, the bail 138 is held in its most stretched state by a vertical edge line 160, as shown in FIG. 20. This position of the bails 136 and 138 is indicated by dash lines in FIG. 18.

With further rotation of the bail 136 the bail 136 reaches its second extreme position as shown in FIG. 21. In this position the bail 136 rests against the edge line 164 and the surface 166 of the bail mounting unit 140. This second extreme position is used when the cover 132 is inverted to serve as a food container as shown in FIG. 18. In this position shown in FIG. 18 the hand grip sections 148 and 150 are located above the cover body 134 on its concave side 146. In this position the hand grip sections 148 and 150 are conveniently positioned as handles for holding the cover body 134 for its food containing function.

It is clear from the above description that the unique structure design of the bails and the bail mounting units allows the bails 136 and 138 to be swung over an angle exceeding 180 degrees.

When the bails 136 and 138 are rotated to their first extreme position on the convex side 144 of the cover body 134, as shown in FIG. 17, the bails 136 and 138 serve as handles for holding the cover body 134 which serves as a cover for the cooking utensil vessel 130. When the bails 136 and 138 are rotated to a second extreme position on the concave side 146 of the cover body 134, as shown in FIG. 18, the bails 136 and 138 serve as handles for holding the cover body 134 as the cover body serves as a food container or as an utensil vessel for any desired use, such as for microwave cooking.

FIGS. 22 and 23 illustrate modified bail mounting units that support bails which can be moved to a recessed position when not in use as handles. A bail mounting unit 168 is partially shown in FIG. 22 and is similar to the bail mounting unit 140 shown in FIG. 19 except for two modifications. The first modification is that the bail mounting unit 168 has a slot 170 rather than the opening 152. The second modification is that the bail mounting unit 168 has a notch 172. A bail 173 with a right angle portion 175 is also shown in FIG. 23.

Rotation of the bail 173 around the bail mounting unit 168 occurs in virtually the same manner as that in which the bail mounting unit 140 is employed, except when the bail 173 is rotated to a horizontal position. At this position the bail 173 and the right angle portion 175 thereof are in alignment with the horizontal slot 170. Thus the bail 173 can be slidably inserted into the slot 170 to the position as indicated by a dash line in FIG. 23. The notch 172 and the slot 170 serve as guide means for the slide motion of the bail 173 and for holding the bail 173 at a horizontal position. To move the bail 173 out of this recessed position the bail 173 is grasped and returned to the horizontal direction as shown in FIG. 23.

In order to fulfill a variety of household cooking needs it is desirable that, in addition to the cooking utensil set of FIG. 17, a second cooking utensil set of similar structure but smaller size, also be provided in a cooking utensil system. This second cooking utensil set comprises a second cooking utensil vessel, not shown, and a second cooking utensil cover. In the present invention this second cooking utensil cover, in addition to being a cover for the second cooking utensil vessel, a food container, and an utensil vessel for microwave cooking, also serves a fourth function, that is, as a cover for the first cooking utensil cover 132 when the first cooking utensil cover 132 serves as a food container or utensil vessel for microwave cooking or for other purposes.

Figure 24:
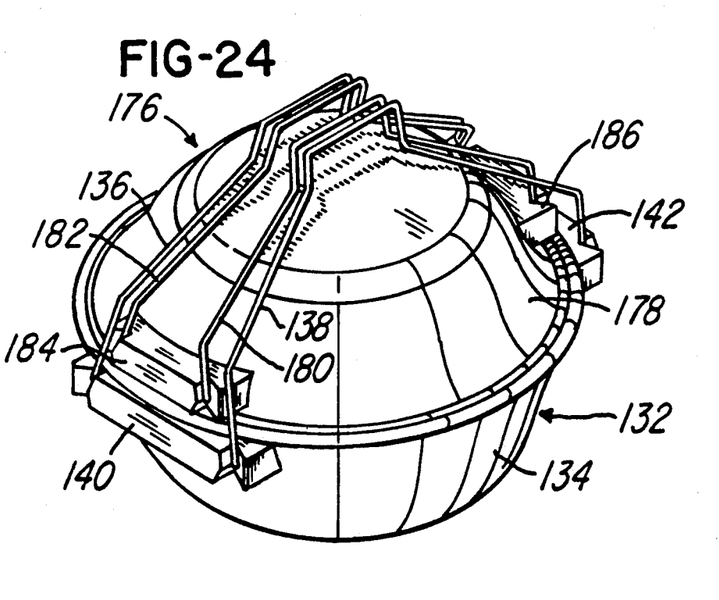
FIG. 24 is a perspective view, drawn on substantially the same scale as FIG. 17, showing the cooking utensil cover of FIG. 17 and a second cooking utensil cover of smaller size, joined together as a unit. The cooking utensil covers are arranged whereby one of the covers serves as a container and the other cooking utensil cover serves as a cover.

FIG. 24 illustrates such an arrangement as described above. The cooking utensil cover 132 is seen here serving as a food container. Resting on top of the cover 132 is a second cooking utensil cover 176. The second cooking utensil cover 176 comprises a concavo-convex cover body 178, a pair of rotatable bails 180 and 182, and a pair of bail mounting units 184 and 186. The bails 180 and 182 are shown rotated to the convex side of the cover body 178 to facilitate the use of the second cooking utensil cover 176 as a cover for the first cooking utensil cover 132.

The bails 136 and 138 shown in FIG. 24 are rotated to the concave side 146 of the cover body 134 as the first cooking utensil cover 132 serves as a food container. However, because of the presence of the cover body 178 these bails 136 and 138 cannot be rotated to the second extreme position previously described and shown in FIG. 18. Further rotation of the bails 136 and 138 toward each other is prevented by the cover body 178, as the bails 136 and 138 come into physical contact with the cover body 178. Due to the fact that at this position the bails 136 and 138 are stretched, a downward spring force is exerted by the bails 136 and 138 on the cover body 178 and thus the cover body 178 is firmly retained in place. To lift both the cooking utensil covers 132 and 176 as an unit, all four bails 136, 138, 180, and 182 are grasped together.

According to the previous discussion, the cover bodies 134 and 178 are preferably constructed of non-metallic material for the purpose of microwave cooking. It is also preferred that these cover bodies 134 and 178 be alternatively constructed of stainless steel. Although with stainless steel these cooking utensil covers 132 and 176 cannot be used for microwave cooking, they can still serve the other three functions admirably well. These three functions are, namely, 1) as covers for their corresponding matching cooking utensil vessels; 2) food containers; and 3) as a cover for another cover, such as use of the cooking utensil cover 176 as a cover for the cooking utensil cover 132 when the cooking utensil cover 132 is serving as a food container or as a cooking (other than microwave cooking) vessel. The technique of making a stainless steel utensil cover has been described previously in relation to the cooking utensil cover 32 (see FIG. 1) and is not be repeated here.

It is also preferred that the larger cover body 134 be constructed of stainless steel while the smaller cover body 178 be constructed of non-metallic material. With stainless steel the weight of the cover body 134 can be minimized while still providing adequate physical strength for general food containing use. On the other hand, the non-metallic cover body 178 will satisfy the microwave cooking needs.

Although the preferred embodiments of the cooking utensil unit of this invention have been described, it will be understood that within the purview of this invention various changes may be made in the form, details, proportion and arrangement of parts, the combination thereof and the construction thereof, which generally stated, consist in a cooking utensil system within the scope of the appended claims.

The invention having thus been described, the following is claimed:

1. A multiple purpose cooking utensil member comprising:
   (A) an invertible concavo-convex body section having a concave side and an opposite convex side including a central portion on said convex side, the body section being invertible between a first body position in which the concave side of the body section faces downwardly whereby the body section serves as a cooking utensil cover, and a second body position in which the concave side of the body section faces upwardly whereby the body section serves as a food container,
   (B) handle means including a hand grip region, the handle means being movably attached to the body section, the handle means being movable to a first handle position wherein the hand grip is disposed above the central portion whereby the handle means serve as support means for the body section with the body section in the first body position, the handle means also being movable to a second handle position wherein the hand grip region is disposed above the concave side of the body section whereby the handle means serve as support means for the body section with the body section in the second body position.

2. The multiple purpose cooking utensil of claim 1 in which the handle means include bail means rotatably attached to the body section.

3. The multiple purpose cooking utensil of claim 1 in which the handle means include a first bail and a second bail rotatably attached to the body section.

4. The multiple purpose cooking utensil of claim 1 in which the handle means include a first bail and a second bail rotatably attached to the body section, and in which the first bail and the second bail are each rotatable over an angle exceeding 180 degrees.

5. The multiple purpose cooking utensil of claim 1 in which the handle means include a first bail and a second bail rotatably attached to the body section and in which the first bail and the second bail each has a hand grip region, and in which the first bail and the second bail are rotatable to a third handle position wherein the hand grip regions of the first bail and the second bail are laterally spaced from the central portion when the body second is in the second body position.

6. The multiple purpose cooking utensil of claim 1 in which the handle means include a first bail and a second bail rotatably attached to the body section and in which the first bail and the second bail each has a hand grip region, and in which the first bail and the second bail are rotatable to a third handle position wherein the hand grip regions of the first bail and the second bail are laterally spaced from the central portion when the body section is in the second body position, and in which said multiple purpose cooking utensil also includes receiver means for receipt of a portion of the first bail and the second bail for maintaining the first bail and the second bail in the third handle position.

7. The multiple purpose cooking utensil of claim 1 in which the handle means include a first bail and a second bail rotatably attached to the body section and in which the first bail and the second bail each has a hand grip region, and in which the first bail and the second bail are rotatable to a third handle position wherein the hand grip regions of the first bail and the second bail are laterally spaced from the central portion when the body section is in the second body position, and which the cooking utensil also includes means forming slots for receipts of a portion of the first bail and the second bail for maintaining the first bail and the second bail in the third handle position.

8. The multiple purpose cooking utensil of claim 1 which also includes mounting means for attaching the handle means to the body section.

9. The multiple purpose cooking utensil of claim 1 which also includes mounting means for attaching the handle means to the body section, said mounting means including surface contour means engageable by the handle means for maintaining the handle means at the first handle position and at the second handle position.

10. The multiple purpose cooking utensil of claim 1 in which the central portion of the body section is substantially flat.

11. The multiple purpose cooking utensil of claim 1 in which the handle means include resilient portions.

12. A cooking system comprising:
(A) a first cooking utensil member which includes (a) a first invertible concavo-convexo body section having a concave side and an opposite convex side, the first body section being invertible between a first body position in which the concave side of the first body section faces downwardly whereby the first body section serves as a cooking utensil cover, and a second body position in which the concave side of the first body section faces upwardly whereby the first body section serves as a food container, (b) and first handle means movably attached to the first body section,
(B) and a second cooking utensil member which includes (a) a second invertible concavo-convex body section having a concavo side and an opposite convex side, the second body section being invertible between a first body position in which the concave side of the second body section faces downwardly whereby the second body section serves as a cooking utensil cover, and a second body position in which the concave side of the second body section faces upwardly whereby the second body section serves as a food container, the first body section being positionable upon the second body section with the concave side of the first body section facing the concave side of the second body section, (b) and second handle means including a hand grip region, the second hand grip region movably attached to the second body section, the second handle means being movable to a first handle position wherein the hand grip region is disposed above the convex side of the second body section when the second body section is in the first body position, the second handle means also being movable to a second handle position engageable with the first body section for releasably securing the first body section to the second body section with the concave side of the first body section facing the concave side of the second body section when the second body section is in the second body position.

13. The cooking system of claim 12 in which the second handle means of the second cooking utensil member include resilient portions.

14. The cooking system of claim 12 in which the second handle means of the second cooking utensil member include a first bail and a second bail.

15. The cooking system of claim 12 in which the second cooking utensil member also includes surface contour means engageable by the second handle means for maintaining the second handle means at the first handle position and at the second handle position.

16. The cooking system of claim 12 in which the hand grip region of the second handle means is disposed above the convex side of the first body section when the second handle means is in the second handle position.

17. A cooking system comprising:
(A) first cooking utensil member which includes (a) a first invertible concavo-convex body section having a concave side and an opposite convex side, the first body section being invertible between a first body position in which the concave side of the first body section faces downwardly whereby the first body section serves as a cooking utensil cover, and a second body position in which the concave side of the first body section faces upwardly whereby the first body section serves as a food container, (b) and first handle means including a hand grip region, the first handle means being movable attached to the first body section, the first handle means being movable to a first handle position wherein the hand grip region of the first handle means is disposed above the convex side of the first body section when the first body section is in the first body position,
(B) and a second cooking utensil member which includes (a) a second invertible concavo-convex body section having a concave side and an opposite convex side, the second body section being invertible between a first body position in which the concave side of the second body section faces downwardly whereby the second body section serves as a cooking utensil cover and a second body position in which the concave side of the second body section faces upwardly whereby the second body section serves as a food container, the first body section being positionable upon the second body section with the concave side of the first body section facing the concave side of the second body section, (b) and second handle means movably attached to the second body section and engageable with the first body section for releasably securing the first body section to the second body section with the concave side of the first body section facing the concave side of the second body section.

18. The cooking of claim 17 in which the first handle means include a first bail and a second bail.

* * * * *

UNITED STATES PATENT AND TRADEMARK OFFICE
CERTIFICATE OF CORRECTION

PATENT NO. : 5,213,028

DATED : May 25, 1993

INVENTOR(S) : Cherng Chang

It is certified that error appears in the above-identified patent and that said Letters Patent is hereby corrected as shown below:

Column 5, line 2, change "election" to ---selection---.

Column 10, line 19, before "is" insert ---region---.

Column 11, line 1, before "which" insert ---in---.

Column 11, line 3, change "receipts" to ---receipt---.

Column 11, line 50, before "movably" insert ---being---.

Column 12, line 30, change "movable" to ---movably---.

Signed and Sealed this

Eighteenth Day of January, 1994

Attest:

BRUCE LEHMAN

Attesting Officer     Commissioner of Patents and Trademarks